United States Patent [19]

Feilchenfeld et al.

[11] Patent Number: 4,646,012
[45] Date of Patent: Feb. 24, 1987

[54] DIGITAL, ELECTROMAGNETIC ROD POSITION INDICATOR WITH PRECISELY CONTROLLED TRANSITIONS BETWEEN DIGITAL STATES

[75] Inventors: Michal M. Feilchenfeld, Churchill; Charles G. Geis, N. Huntingdon, both of Pa.

[73] Assignee: Westinghouse Electric Corp., Pittsburgh, Pa.

[21] Appl. No.: 573,459

[22] Filed: Jan. 24, 1984

[51] Int. Cl.[4] ............... G01B 7/14; G01N 27/72; G08C 19/06; G01F 25/00
[52] U.S. Cl. ............... 324/208; 324/225; 340/870.31; 364/571; 376/258
[58] Field of Search ............... 324/207, 208, 225, 262; 364/560–562, 570, 571, 581; 376/258; 340/870.31, 870.32, 870.33, 870.34

[56] References Cited

U.S. PATENT DOCUMENTS 3,705,400 12/1972 Cordes, Jr. ............... 364/561
3,846,711 11/1974 Takahashi et al. ............... 330/29
3,846,771 11/1974 Young et al. ............... 340/870.31
3,858,191 12/1974 Neuner et al. ............... 340/188 R
3,890,607 6/1975 Pelenc et al. ............... 324/208
3,893,090 7/1975 Neuner et al. ............... 340/188 R
4,418,392 11/1983 Hata ............... 364/571

Primary Examiner—Ernest F. Karlsen
Assistant Examiner—Walter E. Snow
Attorney, Agent, or Firm—Daniel C. Abeles

[57] ABSTRACT

A digital rod position indicator having discrete coils spaced along the travel path of an elongated magnetically permeable member stores in digital form compensation signals for automatically adjusting the location relative to the coils at which the digital output signal representative of the position of the end of the elongate member transitions from one code to the next. The appropriate compensation signal is addressed using the digital output signal and a correction factor which takes into account the direction of movement including reversals.

15 Claims, 7 Drawing Figures

DIGITAL, ELECTROMAGNETIC ROD POSITION INDICATOR WITH PRECISELY CONTROLLED TRANSITIONS BETWEEN DIGITAL STATES

BACKGROUND OF THE INVENTION

1. Field of the Invention

This invention relates to apparatus for detecting the location of an axially movable, magnetically permeable, elongated member using electrical coils spaced along the axis of movement of the elongated member. More particularly, it is directed to such an apparatus which generates a digital signal representative of the location of the end of the elongated member with switching between discrete values of the digital signal precisely controlled relative to the location of the coils.

2. Prior Art

There are many applications where it is desirable to known the precise location of an axially movable metallic rod. One such application is the monitoring of the position of the control rods in a nuclear reactor. As used herein, the term "control rod" is meant to encompass any of the various rods which are inserted into and retracted from the reactor core whether they are used for normal control purposes in the precise sense in which that term is used in the nuclear field or for other purposes.

For pressurized water reactors, it is of the utmost importance to know the accurate position of each of the control rods. Difference in penetration of over 15 inches between neighboring rods are considered unsafe. In addition, accurate knowledge of the position of the control rods versus thermal power output can be used to determine the condition of the reactor fuel. Furthermore, for certain rods, such as the water displacer rods in an advanced pressurized water reactor, the location of the rods must be known within inches in order to assure proper alignment for latching mechanisms. Hence, for these reasons and others, it is important to have an extremely reliable rod position indication system with suitable accuracy in order to maintain a safe and reliable operating condition of the reactor.

The control rods in a pressurized water reactor move within a pressure vessel and are attached to drive rods which can be incrementally moved in a forward or reverse direction by a drive mechanism such as the magnetic jack mechanism described in U.S. Pat. No. 3,158,766. The drive rods extend longitudinally through the pressure vessel along the axis of movement of the control rods into the sealed, pressurized environment of the rod travel housings. Since it is of the utmost importance to maintain the sealed integrity of the pressurized vessel, mechanical penetrations are kept to a minimum to reduce the likelihood of loss of the pressurized environment. Accordingly, no mechanical penetrations are permitted for detecting the relative position of the control rods within the core of the reactor. Inasmuch as it would be very difficult to detect the position of the actual control rods, it has been the practice to detect the position of the drive rods and to derive control rod position therefrom.

There have been a number of schemes devised for detecting drive rod position. Early systems used the change in the impedance of a coil effected by the end of the drive rod as it moved through the coil to generate an analog signal indicative of rod position. The susceptability of such analog systems to variations in temperature, rod magnetization, permeability of the rod, and power supply voltage and frequency, and to interference from adjacent control rods and drive mechanisms, led to the development of digital position indicating systems such as that disclosed in U.S. Pat. No. 3,846,771. This system uses a number of discrete coils spaced along the linear path traced by the end of the rod. The change in the impedance of each coil in sequence as the rod advances through successive coils in used to generate discrete output signals or one output signal with discrete levels. In one embodiment, adjacent coils are each connected to differential amplifiers so that the largest differential signal, which is generated by the amplifier connected to one coil which has been penetrated by the end of the rod and one which has not, indicates rod position.

U.S. Pat. No. 3,858,191 utilizes two sets of these discrete coil detectors interleaved to provide redundancy. In this system, the differential a-c signals in each set of coils are each d-c restored and passed through a low pass filter to extract the d-c component. These d-c difference signals are then applied to the non-inverting inputs of comparators in a tracking level detector/encoder circuit in which the outputs of the comparators are fed back to the inverting inputs on a common bus so that only the comparator to which the difference signal of largest magnitude is applied is switched to the active state. The comparator outputs also generate a coded digital signal representative of the largest difference signal in the set which is processed with the coded signal from the other set to generate a display illustrating the position of the control rod. U.S. Pat. No. 3,893,090 discloses a similar interleaved, redundant system in which the processing means adjusts the display of rod position to the coarser resolution out of service.

While the above digital rod position indicating systems are reliable and provide suitable resolution of rod position, the accuracy of the points relative to the coils at which the transition from one coded signal to the next occurs is dependent on many factors. The most evident of these are: the tolerances of the coils, the tolerances of the resistance components, leakage currents of the capacitive components, hysteresis of the comparators and variations in the magnetic flux density over the range of rod travel. Tight control of these factors such as through careful matching of the coils adds to the cost of the system, and may not even then provide the accuracy required by the user. In such an instance, individual fine adjustment of each transition may be necessary, but becomes cumbersome when high accuracy is required at a large number of points.

SUMMARY OF THE INVENTION

According to the invention, the location of an elongated, magnetically permeable, longitudinally movable member is determined by an arrangement which includes a plurality of spaced electrical coils through which the elongated member passes in moving longitudinally. With a-c power applied to the coils, an output signal generator connected to the coils responds to the change in coil impedance which occurs as the end of the elongated member passes through each coil, and generates a digital output signal indicative of the position of the elongated member. This digital output signal transitions from one digital value to another as the end of the elongated member passes through a coil. In order to precisely locate the position of the end of the elongated member relative to the coils at which these transitions take place, a compensation signal for each transition is stored. Selection means responsive to the output signal generator select the appropriate compensation signal for the coil being approached by the end of the elongated member. The selected compensation is applied to the output signal generator to axially adjust the location relative to the coil being approached at which the digital output signal switches from one signal to the next.

The present invention provides a digital position indicator with significantly increased accuracy without the expense and effort required to carefully select and precisely locate components. It also eliminates the need to provide on-board adjustments such as potentiometers which in some cases in the past, have been interactive and thus required iterative adjustment. The digital nature of the compensation also eliminates drift.

BRIEF DESCRIPTION OF THE DRAWINGS

FIGS. 3a through h are waveform diagrams illustrating the operation of selected portions of the digital position indicator of this invention;

DESCRIPTION OF THE PREFERRED EMBODIMENT

Figure 1:
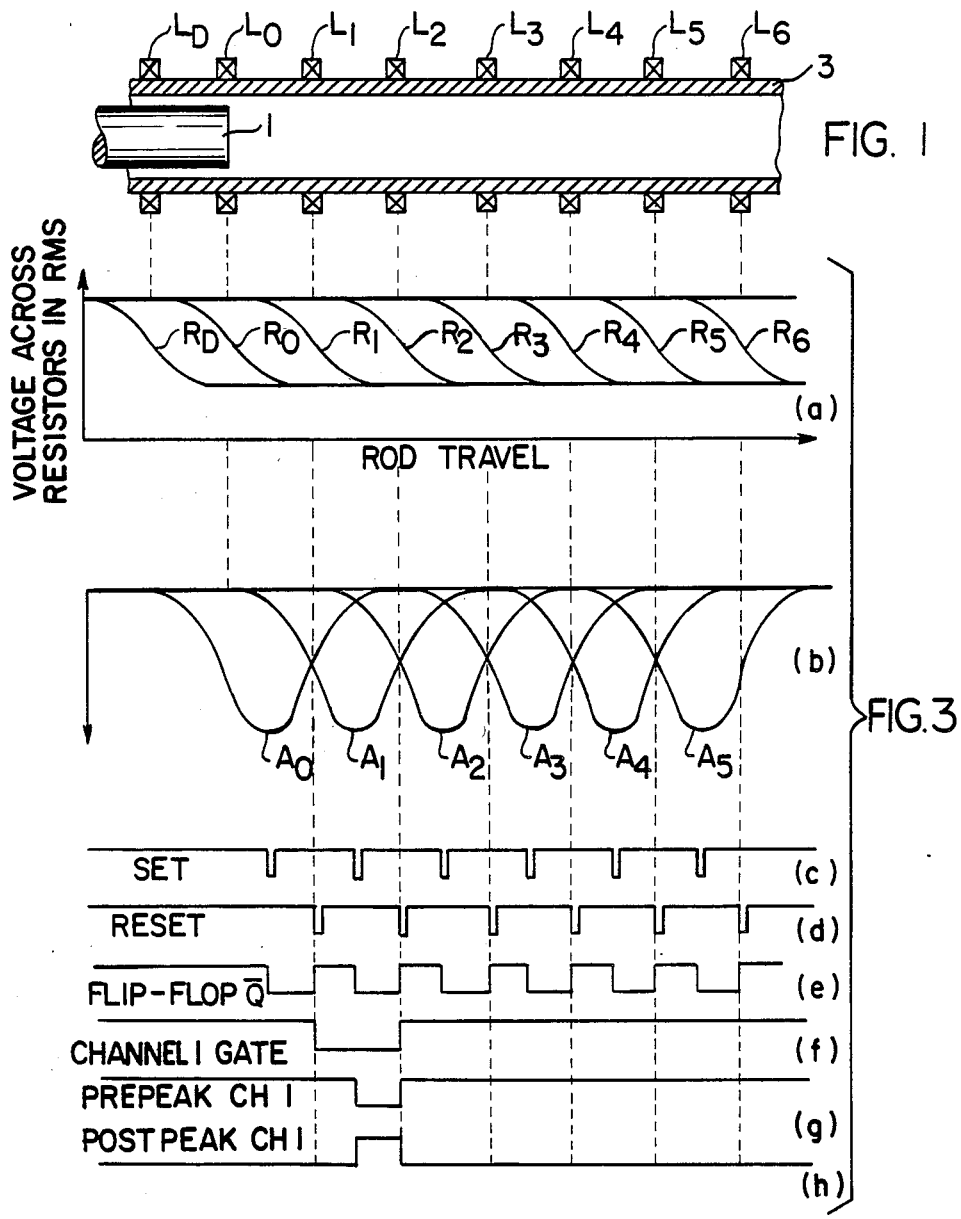
FIG. 1 is a longitudinal section through a portion of a drive rod assembly showing the arrangement of the coils of a digital position detector which is adaptable for use in accordance with the teachings of this invention.

While the invention will be described as applied to a position indicating system for the control rods in a nuclear reactor, it is to be understood that the invention has broader application to any installation where it is desirable to precisely, digitally define the location of an elongated, magnetically permeable, longitudinally movable member. As seen in FIG. 1, the elongated drive rod 1 is longitudinally movable within a tubular housing 3. The drive rod is made of a material of high magnetic permeability, in this case steel. A plurality of electrical coils, $L_1$ to $L_6$ shown, surround the housing 3 at spaced intervals. The number of coils is selected to provide the required resolution of rod position over the range of rod travel. In the example, sixty-four coils, $L_0$ to $L_{63}$, are provided. In addition, one or more dummy coils, $L_d$, (only one shown) are provided at each end of the array of coils in order to maintain linearity of the detector at the limits of rod travel.

Each of the coils, $L_0$ to $L_{63}$, and the dummy coils are energized by a low voltage, low frequency, for instance 60 hertz, a-c power source. The magnetic fields generated by such a low frequency current in the coils penetrate the magnetically permeable housing 3 and, where it is present, the drive rod 1. As the end of the drive rod 1 passes through each coil, the impedance of the coil changes. Since the rod is made of magnetically permeable material, the impedance of the coils which have been penetrated by the drive rod increases and thus, the location of the end of the rod can be determined by monitoring the relative impedances of adjacent pairs of coils. With a constant voltage a-c source applied to the coils, these changes in impedance can be detected by monitoring the resulting change in coil current which in turn can be measured as a change in the voltage across a sampling resistor in series with the coil.

Figure 2:
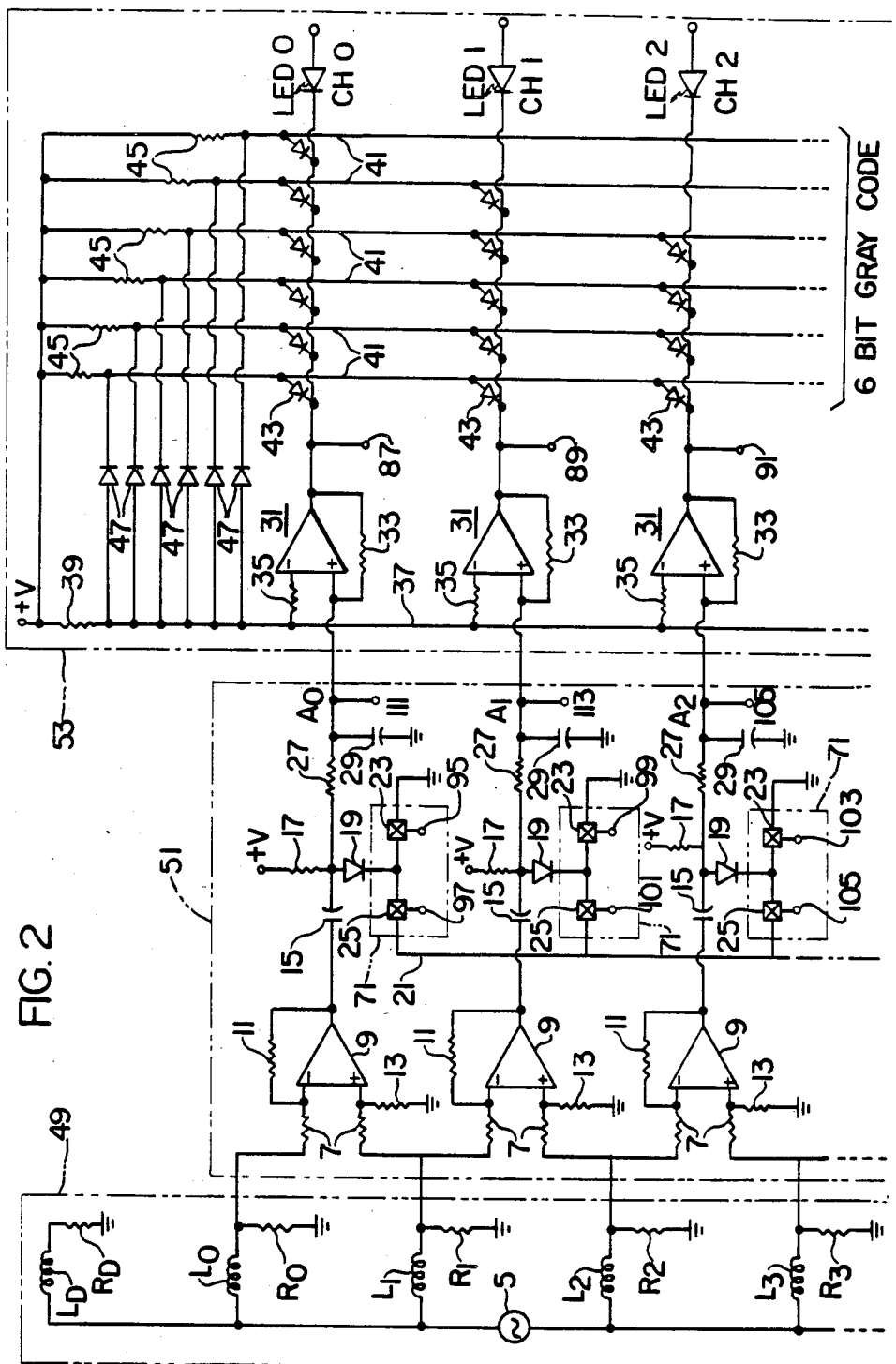
FIG. 2 is a schematic diagram illustrating the circuits connected to the coils of the detector shown in FIG. 1 as adapted for the present invention.

FIG. 2 illustrates the basic circuitry for generating discrete output signals representative of the position of the drive rod 1. Although only the circuitry associated with coils $L_1$ through $L_3$ and the adjacent dummy coil are shown, similar circuitry is provided for the remaining coils. Each of the coils is energized by a low voltage, 60 hertz source 5. The change in impedance in each coil effected by penetration of the coil by the rod 1 is measured as a change in voltage across an associated sampling resistor $R_0$ through $R_{64}$ in series with the coil.

The voltages across each pair of adjacent sampling resistors are applied through input resistors 7 to an operational amplifier 9 provided with negative feedback through resistor 11 to generate an a-c difference signal. The signal applied to the noninverting input of each operational amplifier 9 is applied across a resistor 13 which is made equal in value to the feedback resistor 11 in order to provide a conventional subtraction. The signal generated by the dummy coil $L_d$ is not used, but the presence of this coil balances the conditions that the coil $L_o$ is subjected to so that linearity is maintained.

The a-c difference signals are converted to d-c signals by d-c restorers and low pass filters. The d-c restorers include capacitors 15, a d-c voltage source applied through resistors 17, and diodes 19 connected to ground or a common lead 21 through a pair of analog switches 23 and 25 respectively. The low pass filters include series resistors 27 and shunt capacitors 29.

The d-c difference signals, $A_0$ through $A_{62}$ are each applied to the non-inverting input of an operational amplifier configured as a comparator 31 with a positive feedback resistor 33. The inverting input of each comparator 31 is connected through a resistor 35 to a common lead 37 which is energized by a positive d-c voltage through resistor 39. The output of each comparator 31 is connected to a light emitting diode LED 0 through LED 62 which is energized when the d-c difference signal applied to the associated comparator exceeds the voltage on the common lead 37. The output of each comparator 31 is also connected to certain ones of six leads 41 through diodes 43 in a pattern unique to each comparator. The leads 41 are each energized by a positive d-c source through a resistor 45. The output of an active comparator pulls the leads 41 connected to it by diodes 43 down to generate a discrete six-bit coded signal which identifies the specific comparator. In the example shown, the diodes 43 are connected to the outputs of successive comparators 31 to generate a digital output signal in gray code. The six leads 41 are also each connected to the common lead 37 through isolating diodes 47 so that the inverting input of each comparator is pulled down to the level of the lowest output signal of any comparator. Since the high gain of the comparator drives the output down until the feedback signal on the inverting input is substantially equal to the signal on the non-inverting input, the signal on the common lead 37 is equal to the d-c difference signal of greatest magnitude (most negative). In this manner, only one comparator 31 at a time will be in the active state and this will be the one which has the largest d-c difference signal applied to its non-inverting input.

The operation of the circuit of FIG. 2 can be more easily understood by reference to the waveforms of FIGS. 3a and b. FIG. 3a represents the RMS value of the a-c voltage across the resistors $R_0$ through $R_6$. As the end of drive rod 1 passes through a coil, its impedance rises reducing coil current and thereby reducing the voltage across the associated sampling resistor. The voltages across adjacent sampling resistors are subtracted in the difference amplifiers 9 to generate inverted a-c difference signals which pass through the d-c restorers and low pass filters to generate negative going d-c difference signals such as $A_0$ to $A_5$ shown in FIG. 3b. These negative d-c difference signals are then applied to the comparators 31. The largest d-c difference signal will pull the output of its comparator 31 down the farthest and it will be this signal which is applied to the inverting inputs of all of the comparators 31 through lead 37 so that only the comparator to which the largest d-c difference signal is applied will be in the active state. Thus, as the end of the rod 1 moves toward coil $L_1$ from $L_0$ the d-c difference signal $A_0$ shown in FIG. 3b is the largest and the comparator 31 to which it is applied will be in the active state to energize LED 0 of channel 0. This also pulls down the signal on all of the leads 41 to generate a gray code signal which indicates that channel 0 is energized and that the end of rod 1 is between coils $L_0$ and $L_1$. As the end of the rod approaches coil $L_2$, d-c difference signal $A_1$ rises in magnitude as signal $A_0$ falls and as the end of the rod passes coil $L_1$, $A_1$ becomes larger than $A_0$ so that LED 0 is switched off and LED 1 is turned on with an accompanying change in the 6 bit gray code signal. Thus, the successive channels are sequentially energized in synchronism with the movement of the rod to generate a digital output representative of the location of the end of the rod.

Figure 4:
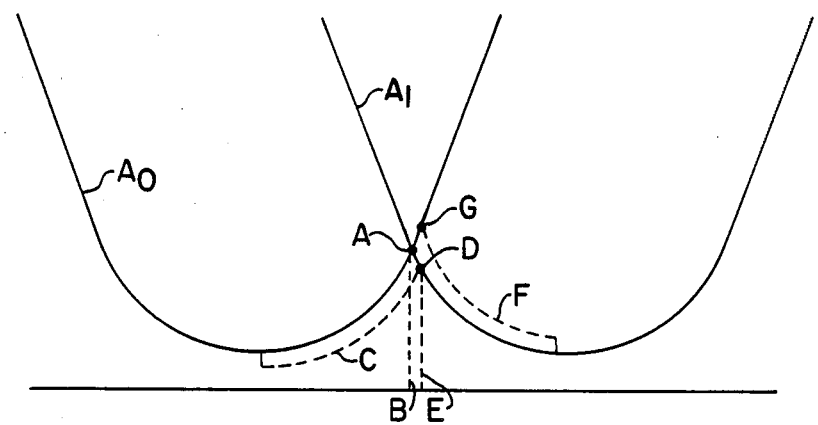
FIG. 4 is a waveform diagram illustrating the manner in which compensation applied by this invention affects the waveform of FIG. 3b.

What has been described to this point is a known system which provides a reliable digital indication of the location of the drive rod 1. In order to provide a more accurate location of the point relative to the coils at which the indicator system transitions from one channel to the next, the present invention adds a compensation signal to the difference signal. The effect of this adjustment on the system of FIG. 2 is illustrated in FIG. 4. As the end of rod 1 approaches coil $L_1$, the d-c difference signal $A_0$ of the active channel, channel 0, is decreasing in magnitude and the transition to channel 1 occurs when the magnitude of $A_0$ becomes equal to the magnitude of $A_1$ at point A. The position of this uncompensated transition is projected onto the axis of longitudinal movement of rod 1 as point B. By adding compensation to the signal $A_0$, its effective value is shifted to the line C which intersects the curve $A_1$ at point D which, as seen when projected to the axis of movement as point E, results in a shift of the transition point between channels 0 and 1 to the right by the amount E-B. With the location of the end of the rod 1 between coils $L_1$ and $L_2$, channel 2 is energized. If the direction of the rod 1 is then reversed so that it again approaches coil 1 but from the direction of coil 2, difference signal $A_1$ is the active signal applied to the non-inverting input of the comparators 31, and thus as seen in FIG. 4, the compensation must be applied to the signal $A_1$ in the opposite sense to shift its effective value to the line F so that the transition is made back to channel 0 at the point G which, since the curves $A_0$ and $A_1$ are substantially linear over the range of the shift, which has been exaggerated here for illustrative purposes, is substantially vertically aligned with the point E. Thus, the same magnitude of compensation is applied as a coil is approached from either side, but the sense of the correction signal is reversed when approaching the transition point from one direction as opposed to the other.

The compensation signals are injected into the circuit of FIG. 2 through the common lead 21 and the analog switches 23 and 25. These analog switches operate in a complementary fashion so that when the switch 23 of a particular channel is open, the switch 25 is closed and vice versa. With the switch 25 of a particular channel closed, the compensation signal on lead 21 is added to the effect of the d-c restorer which shifts the effective value of the d-c difference signal generated as shown in FIG. 4.

Figure 5:
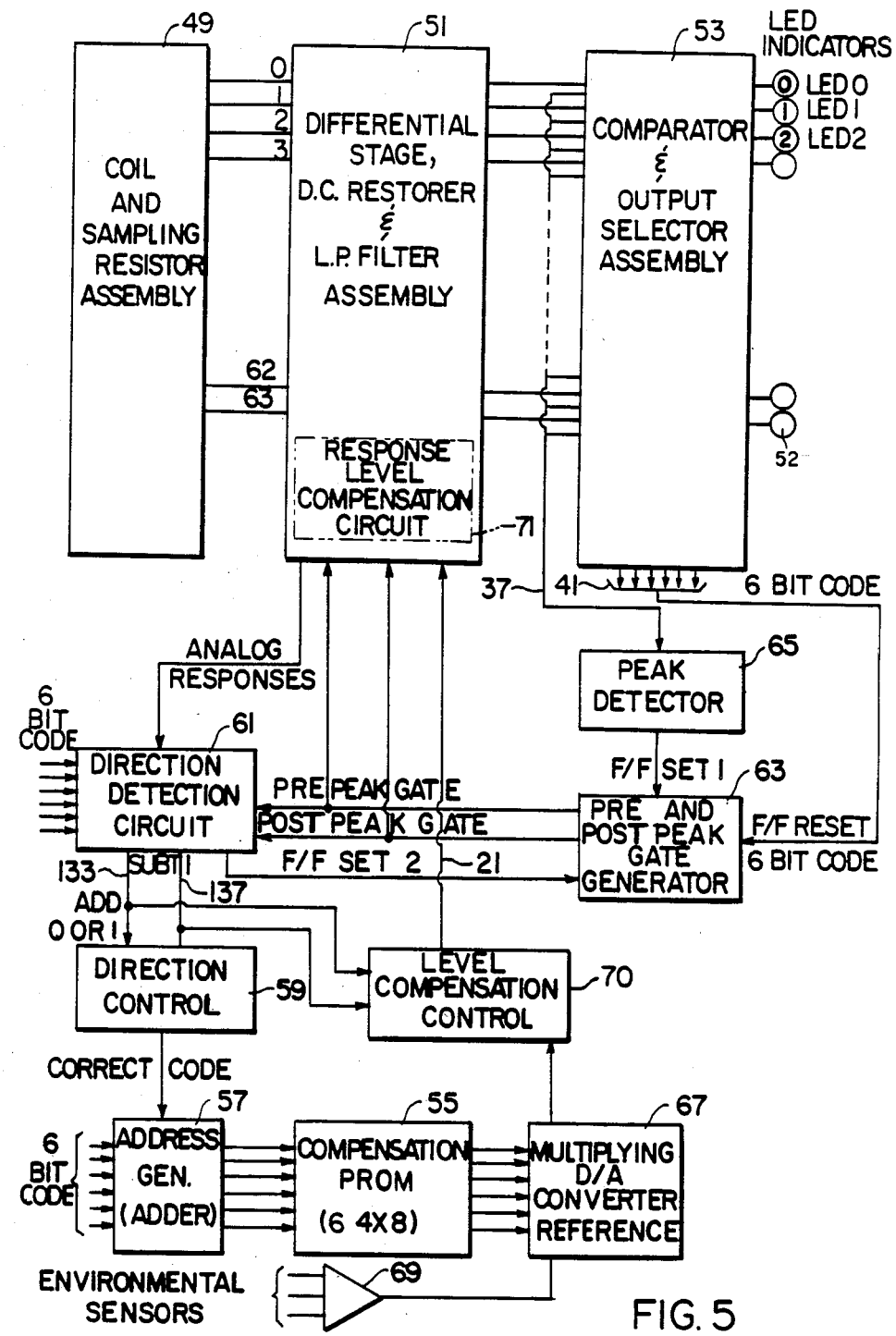
FIG. 5 is a block diagram of the digital position indicator of this invention.

Selection of the proper magnitude and sense of the compensation signal and operation of the analog switches 23 and 25 are controlled by circuitry which is shown in block diagram form in FIG. 5 wherein the coil and sampling resistor assembly of FIG. 2 is represented by the block 49, the differential stage, d-c restorer and low pass filter assembly by the block 51 and the comparator and output selector assembly by the block 53. The compensation signal for each coil location is stored in a PROM 55 as an 8 bit digital word. The proper signal is selected by an address generator/adder 57 which receives the 6 bit gray code signal from the comparator and output selector block 53 representing the active channel. As will become evident from the discussion below, it is necessary under many circumstances to increase or decrease the address by 1 to take into account the direction in which the rod is traveling, to account for reversals in rod direction or after a return to power in order to select the proper compensation signal. The address is corrected by a direction control 59 which receives a directive to add 1 or 0, or subtract 1 from a direction detection circuit 61. The direction detection circuit 61 generates these signals from the d-c analog difference signals generated in the differential stage, d-c restorer and low pass filter assembly 51 and pre and post peak gate signals generated by a correspondingly labeled signal generator 63. These gate signals are generated in response to a set signal from a peak detector 65 which monitors the analog signal on line 37, and to a reset signal generated from the 6 bit gray code signal on lines 41.

The selected digital compensation signal from PROM 55 is converted to an analog signal and adjusted for environmental conditions, such as changes in temperature, in a multiplying digital to analog converter 67. Signals from the environmental sensors are applied to the D/A converter 67 through a summing amplifier 69. The adjusted compensation signal is given the proper sense in level compensation control circuit 71 which responds to the direction control circuit 61 such that the compensation is added to the difference signal when the rod is moving in one direction and subtracted when it is moving in the opposite direction as explained in connection with FIG. 4. The adjusted compensation signal of the proper sense is then applied by the common lead 27 shown in FIG. 2 to the elements of a response level compensation circuit 71 which comprises the sets of analog switches 23 and 25 associated with each channel. These switches in turn, are controlled by the pre and post peak gates generated by the gate generator 63.

Before explaining the details of the Pre and Post Peak Gate Generator 63 and the Direction Detection Circuit 61, it is helpful to understand the reasons for these circuits. Referring to FIGS. 2 and 3b, it can be appreciated that when the end of rod 1 is between coils $L_1$ and $L_2$, channel 1 is active and therefore an address of 1 is applied to the address generator 57 by the 6 bit code. By choice the appropriate compensation for the transition between channel 1 and channel 0 is stored at address 1. Thus, if the rod 1 is traveling downward toward coil $L_1$ the proper compensation has been selected. If the rod 1 is traveling upward, however, the address must be indexed by 1 to select the proper address for the compensation to be applied for the transition between channel 1 and channel 2. In order to assure that the proper compensation has been selected in time, the selection is made at the midpoint between coils when the value of the difference signal and therefore the output signals on line 41 is at its peak. Thus, when the rod is going up, a correction factor of 1 is added at the midpoint between coils to the gray code signal to generate the address for the compensation for the coil being approached and 0 is added going down.

The difficulty arises when the rod reverses direction. There are several conditions under which this can occur:

1. The rod is traveling up and reverses direction before the peak. No correction in the address is needed in this case.

2. The rod is traveling up and reverses direction after the peak. In this case, a 1 must be subtracted from the address.

3. The rod is traveling down and reverses before the peak. A 1 must be added to the address. Since no peak will be reached in this case, other means must be used to initiate the addition.

4. The rod is traveling down and reverses after the peak. No correction is required because a one will be added by the normal up sequence when the rod again passes the peak.

Difficulties can also occur if there is a loss and then a return to power. If the rod is traveling up and has passed the peak when the power is restored, a signal must be generated to add a one to the address.

Figure 6:
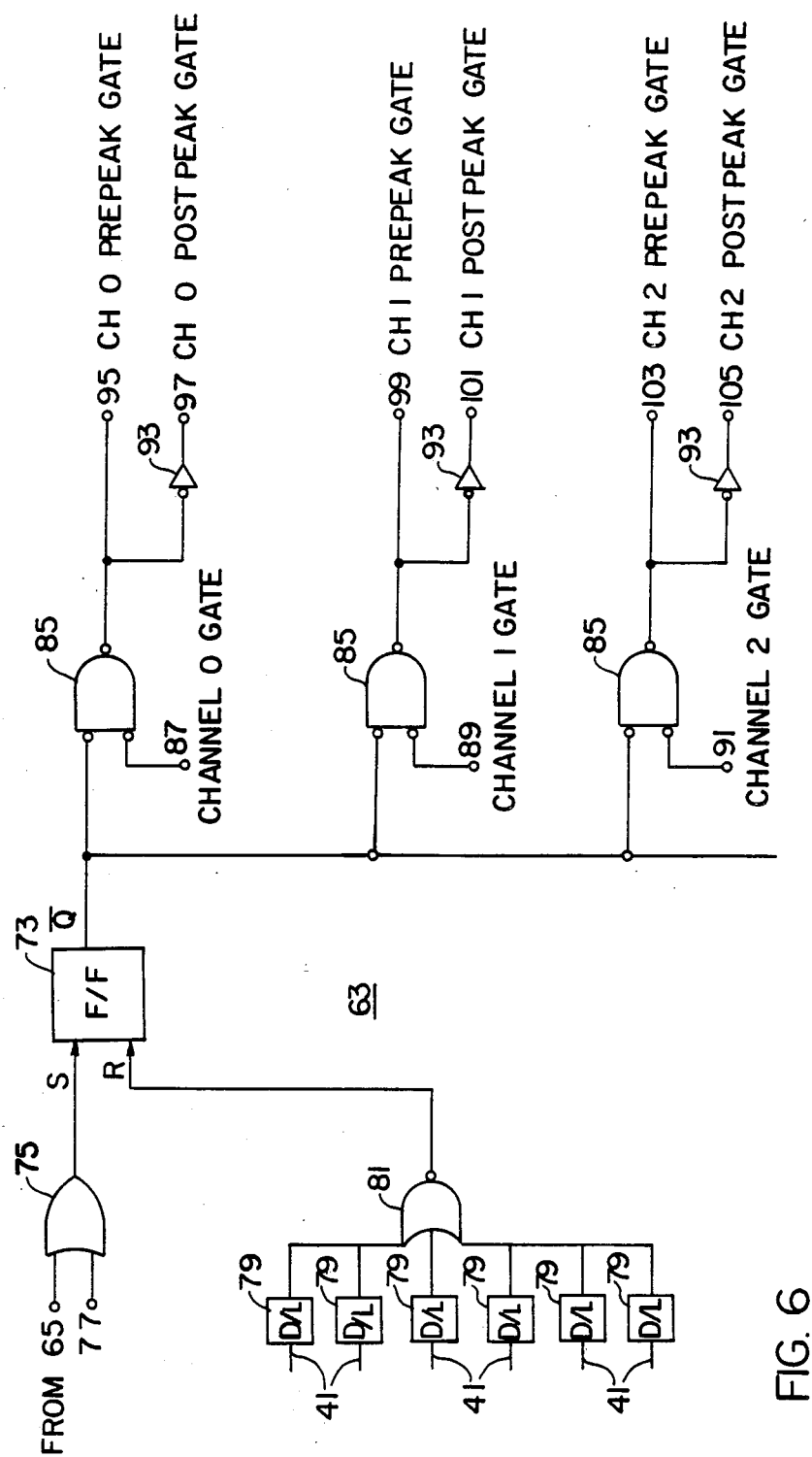
FIGS. 6 and 7 are more detailed schematic circuit diagrams of portions of the detector shown in block diagram form in FIG. 5.

FIG. 6 illustrates the details of the Pre and Post Peak Gate Generator 63. This circuit includes a flip-flop 73 which is set through on OR 75 by the negative going pulse generated by the peak detector 65 or by a signal from terminal 77 of the Direction Detection Circuit 61. The flip-flop 73 is reset by a signal which is generated each time the b bit gray code changes. Differentiator/Limiters 79 connected to each of the leads 41 generate positive pulses at the trailing edge of the old code which are applied through a NOR element 81 as a negative reset pulse to the flip-flop 73 as the end of the rod 1 passes one of the coils. The complementary output $\overline{Q}$ of the flip-flop 73 is applied to one input of a negative AND element 85 associated with each channel of the position indicator. The other input to each negative AND element 85 is connected to the comparator output for the associated channel such as at the point 87 in FIG. 2 for channel 0, point 89 for channel 1, and point 91 for channel 2. The direct output for each negative AND element 85 is the pre-peak gate signal for the associated channel. An inverter 93 generates the complementary post-peak gate signal. The respective pre and post peak gate signals are applied to the analog switches 23 and 25 in FIG. 2 in the associated channel at the terminals indicated.

The operation of the Pre and Post Peak Gate Generator 63 of FIG. 6 is illustrated graphically in FIGS. 3c through h. As shown by wave form 3c, negative set pulses are generated by the Peak Detector 65 at the midpoints between coils. The set pulse applied to the flip-flop 73 causes the output, identified as the "F/F $\overline{Q}$" signal in FIG. 3e, to go negative. The reset pulse of FIG. 3d which is generated, after the code is changed, restores the "F/F $\overline{Q}$" signal to its original level. The channel signals from the circuit of FIG. 2 sequentially enable the negative AND elements 85 such that, for instance, the channel 1 gate signal shown in FIG. 3f applied to terminal 89 of the negative AND element 85 associated with channel 1 enables this device so that its output, which is shown in FIG. 3g and is the channel 1 pre-peak gate signal, goes low when the "F/F $\overline{Q}$" signal goes low. When the flip-flop 73 is reset, the channel 1 pre-peak signal returns to its original level. As seen in FIG. 3h, the channel 1 post-peak signal generated by the associated inverter 93 generates a complementary waveform.

Figure 7:
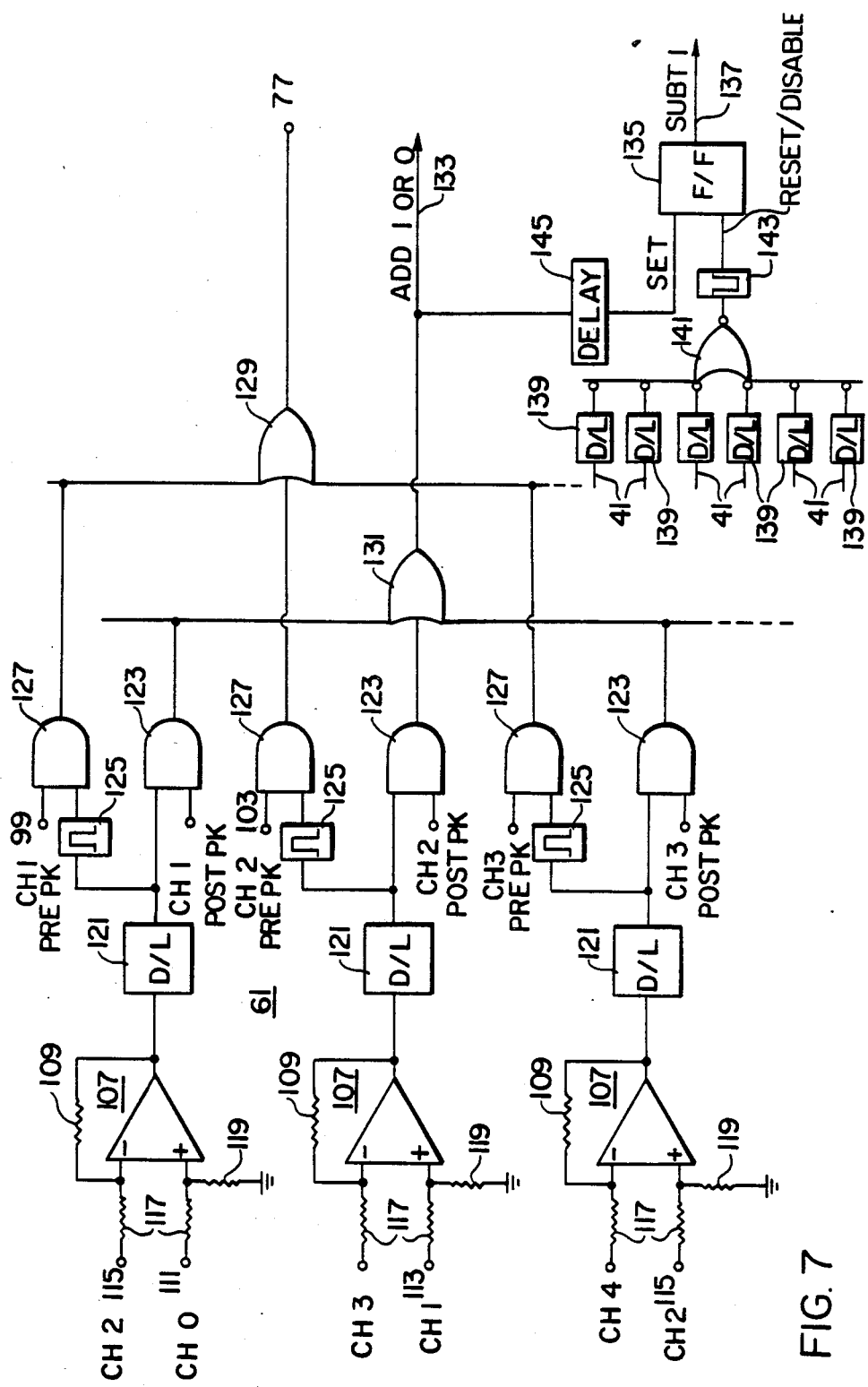

FIG. 7 illustrates an example of the Direction Detection Circuit 61. This circuit monitors the magnitudes of the analog signals for the two channels on either side of the active channel and from their difference determines in which direction the rod 1 is moving. The analog signals are subtracted in differential amplifiers 107 comprised of operational amplifiers provided with negative feedback through resistors 109. The analog signals, for instance for channel 1, the channel 0 and channel 2 signals from terminals 111 and 115 of FIG. 2, are applied to the differential amplifiers through input resistors 117 and across resistors 119 for the noninverting inputs. The output of these differential amplifiers which increases in magnitude as the rod moves up and decreases as it moves down are applied to differentiator/limiters 121 which generate an output signal representative of the slope of the applied difference signal. For positive values of the slope, i.e. while the rod is moving upward, the level is positive. For negative slope values, the level is limited to ground. The output of each differentiator/limiter 121 is gated by the post-peak gate for the associated channel in an AND element 123. The differentiator/limiter output of each channel is also applied to a pulse shaper 125, such as a monostable, which gates an AND element 127 with a pulse generated from the leading edge of the slope signal. The outputs of all the AND elements 127 are ORed in OR element 129 with the resultant signal applied to the set input of the flip-flop 73 in the Pre and Post Peak Gate Generator 63 of FIG. 6 through terminal 77. The outputs of the AND elements 123 generate the "ADD 1 or 0" signal for the Direction Control 59 shown in FIG. 2 on lead 133 through OR element 131. This "ADD 1 or 0" signal is also applied to the set input of a flip-flop 135 which generates on lead 137 the "SUBTRACT 1" signal which is also applied to the Direction Control 59. The flip-flop 135 is set by the negative going edge of the "ADD 1 or 0" signal delayed by delay circuit 145 and is reset by the outputs of differentiator/limiters 139, combined in a negative OR gate 141 and followed by a monostable Pulse Shaper 143. This shaper also disables the flip-flop and prevents it from spurious triggering by the -ve going edge occuring on line 133 and generated by the post peak gate trailing edge during code transition.

The Direction Detection circuit 61 operates as follows. With the end of rod 1 moving upward in channel 1 (between coil $L_1$ and $L_2$), the amplifier 107 DC level resulting from the subtraction of the analog signal $A_2$ from $A_0$ and associated with channel 1 increases. This signal exhibiting positive slope is differentiated, resulting in a +ve voltage generated by the associated differentiator/limiter 121. When the midpoint between coils is reached, the Pre and Post Peak Gate Generator 63 generates the channel 1 post peak gate signal which gates the differentiator/limiter output through AND element 123 and OR element 131 to place a logic 1 (high) on lead 133. This state indicates that 1 is added by direction control 59 to the address generated by address generator 57. Hence, the copmensation stored in the PROM 55 at address 2 is used as the end of the rod approaches coil 2 while traveling upward. After coil 2 is passed, channel 2 becomes active and until the midpoint between coil 2 and 3 is reached the post peak gate for channel 2 is inactive so that a zero signal is generated on lead 133 and the address generafor generates an address of 2 from the 6 bit gray code. When the channel 2 post peak gate goes active at the midpoint, the lead 133 again goes active such that an address of 3 is generated. When the rod is traveling down, the slope of the output of differential amplifiers 107 is negative, and the output of differentiator limiter 121 is at logic 0 (low). This low level is gated by elements 123 and element 131 placing logic 0 (low) on lead 133. For this direction of travel, the address correction is zero so that the 6 bit gray code alone determines the address of the compensation signal.

For the conditions discussed above under which the rod reverses direction, operation of the circuit of FIG. 7 is as follows:

1. If the upward traveling rod reverses direction before it reaches a peak, the signal on the lead 133 is logic 0 (low) (add 0) and hence no correction is necessary.

2. If the rod is traveling up and is beyond the midpoint such that a logic 1 is generated on the lead 133, reversal of rod direction causes this signal to return to the logic 0 (low) state thus triggering flip-flop 135 which generates a signal on lead 137 to cause the direction control 59 to substract 1 from the stored address. Thus, the 1 that was added to the 6 bit gray code to determine the address when the rod passed the midpoint on the way up, is subtracted on the way down. When the code transition point is passed, the flip-flop 135 is reset by the leading edge of the new channel code and continued travel in the down direction requires no further correction.

3. If the rod is traveling down and reverses direction before reaching the midpoint, 1 must be added to the 6 bit gray code to generate the correct address but the peak will not be reached to generate the post peak gate signal. However, when the rod starts traveling up the leading edge of the output of the associated differentiator/limiter 121 will cause the pulse shaper 125 to generator a set pulse for the Pre and Post Peak Gate Generator 63 to generator a post peak gate signal. This gate along with the output of the differentiator/limiter will produce the required logic 1 signal on lead 133.

4. If the rod is traveling downward and reverses direction after passing the peak, no special action need be taken because as the rod passes the midpoint traveling upward, 1 will be added to the channel code to generate the correct address as in normal upward travel.

The circuit of FIG. 7 also provides the necessary code correction after power line interruption. If at the moment of power interruption the rod is stopped before the peak (irrespective of direction of travel), the appropriate code correction is generated when the power is restored and the peak is reached. If the rod is stopped past the peak while moving up, when power is restored and the rod starts moving up, a logic level 1 will be generated on lead 133. If the rod was moving down, when stopped past peak, there is no need for a post peak gate as the required correction level is logic 0, which is provided even in the absence of the gate.

From the above description, it can be seen that the present invention stores a compensation signal for correction of the physical location of the transition from one digital code to the next and provides means for selection of the appropriate compensation signal under various conditions. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for detecting the location of the end of an elongated, longitudinally movable magnetically permeable, member comprising:
a plurality of spaced, discrete electrical coils through which the elongated member passes in moving longitudinally;
an alternating current source electrically coupled to each of said coils;
output signal generating means connected to said coils which responds to the change in impedance thereof as the end of said magnetically permeable, elongated member passes through each coil by generating a coded digital output signal representative of the location of the end of said magnetic permeable elongated member relative to said coils, said output signal changing from one digital value to the next as the end of said elongated member passes one of said coils;
means for storing a compensation signal for each of said coil locations;
means responsive to the digital output signal generated by the digital output signal generating means for selecting the appropriate stored compensation signal for the coil being approached by the end of said elongated member; and
means for applying said selected compensation signal to the digital output signal generating means to adjust the location relative to the coil being approached at which the digital output signal changes from one value to the next.

2. The apparatus of claim 1 wherein the means for selecting the appropriate stored compensation signal includes means for determining the direction of movement of the elongated member and wherein the means for applying the selected compensation signal includes means responsive to said direction determining means for applying said compensation signal in one sense when the elongated member is moving in a first direction and for applying said compensation signal in the opposite sense when the elongated member is moving in the opposite direction.

3. The apparatus of claim 1 wherein said digital output signal generating means includes means for generating signals equal to the difference between signals generated by each pair of adjacent coils, and output selecting means for selecting as the output signal, a digital output signal associated with the difference signal having the largest magnitude, and wherein said means for applying said compensation signal responds to said digital output signal to apply said compensation signal to said largest difference signal.

4. The apparatus of claim 3 wherein said storing means includes a digital address for each stored compensation signal and wherein the means for selecting the appropriate stored compensation signal includes:
   means responsive to the direction of travel of the elongated member for generating an address correction factor; and
   address generating means responsive to the digital output signal and the address correction factor for generating the digital address of said appropriate compensation signal.

5. The apparatus of claim 4 wherein said direction responsive means includes means responsive to a change in the direction of travel of said elongated member.

6. The apparatus of claim 5 wherein said means for applying the selected compensation signal include means responsive to said direction responsive means for applying said compensation signal to said largest difference signal in one sense when said elongated member is moving in a first direction and for applying said compensation signal in the opposite sense when said elongated member is moving in the opposite direction.

7. The apparatus of claim 6 wherein said direction response means includes means for generating a rate signal representative of the rate of change between the difference signals adjacent said largest difference signal which represents movement of the elongated member in one direction when said rate signal is of a first sense and movement in the other direction when it is of the opposite sense.

8. The apparatus of claim 4 wherein said direction responsive means includes means for generating a correction factor of one when said elongated member is moving in one direction and a zero when it is moving in the other direction and wherein said address generating means adds said correction factor to the digital value of said digital output signal to generate the selected address.

9. The apparatus of claim 8 wherein said direction responsive means generates said correction factor when the end of said elongated member is intermediate the locate of said coils.

10. The apparatus of claim 9 wherein said direction responsive means generates said correction factor when the end of said elongated member is substantially at the midpoint between adjacent coils.

11. The apparatus of claim 10 wherein said direction responsive means includes means responsive to the magnitude of said largest difference signal for generating said correction factor when said largest difference signal reaches its peak value.

12. The apparatus of claim 11 wherein said direction responsive means includes means responsive to a reversal of the direction of movement of said elongated member after a correction factor of one has been added to the address for generating a correction factor of minus one which is added to the digital output signal to generate the appropriate address.

13. The apparatus of claim 12 wherein said direction responsive means includes means responsive to a reversal of direction before the largest differential signal reaches a peak while traveling in said other direction in which a correction factor of zero is generated for generating a correction factor of one which is added to the digital output signal to generate the appropriate address.

14. The apparatus of claim 13 wherein said direction responsive means includes means for generating a rate signal representative of the rate of change between the difference signals adjacent said largest difference signal which represents movement of the elongated member in one direction when said rate signal is of a first sense and movement in the other direction when it is of the opposite sense.

15. The apparatus of claim 14 wherein said means for applying said selected compensation signal include means responsive to said rate signal for applying the selected compensation signal to the largest difference signal in a first sense when the rate signal is of one sense and in the opposite sense when the rate signal is of the other sense.

* * * * *